United States Patent Office 3,230,202
Patented Jan. 18, 1966

3,230,202
EPOXIDE COMPOSITIONS
Samuel W. Tinsley, South Charleston, and Paul S. Starcher, Charleston, W. Va., assignors to Union Carbide Corporation, a corporation of New York
No Drawing. Filed Sept. 13, 1960, Ser. No. 55,729
14 Claims. (Cl. 260—78.5)

This invention relates to epoxide compositions. In one aspect, this invention relates to the preparation of 4-oxatetracyclo[6.2.1.0$^{2,7}$.0$^{3,5}$]undec-9-yl derivatives. In another aspect, this invention relates to polymerized compositions containing the 4-oxatetracyclo[6.2.1.0$^{2,7}$.0$^{3,5}$]undec-9-yl unsaturated derivatives.

The polymerizable compositions of the invention can be readily handled in resin-forming operations such as coating, laminating, bonding, molding, casting, potting, and the like. These polymerizable compositions are capable of accepting solid materials, such as fillers and pigments, for providing various effects in physical properties and coloration. With or without such added solid materials, the polymerizable compositions can be made to fill small intricacies of molds without the necessity of applying high pressures or heating to high temperatures, although such measures can be employed, if desired. The polymerizable compositions also can be easily spread, brushed, or sprayed by many techniques available in the paint, lacquer, and varnish industries for making coatings and finishes. The polymerizable compositions are capable of being accurately shaped by molds having intricate molding surfaces and fully cured to resins carrying exact details of such molding surfaces. They can be also advantageously employed in the potting of such fragile articles as electronic components.

The curable, polymerizable compositions of the invention also can be partially reacted at elevated temperatures to form viscous thermosetting liquids or thermosetting solids. The resulting thermosetting intermediate reaction products can be dissolved in an inert normally-liquid organic medium and applied as heat-curable coatings. To aid solution, the thermosetting solid products can be powdered or granulated, if desired. The thermosetting solids also can be used as molding powder compositions which can be converted to fully cured solid products by the application of heat and/or pressure. Numerous other uses, applications, and unexpected advantages and results will be come apparent upon a consideration of the various embodiments of the invention which are discussed hereinafter.

Accordingly, one or more of the following objects will be achieved by the practice of the invention.

It is an object of the invention to prepare novel 4-oxatetracyclo [6.2.1.0$^{2,7}$.0$^{3,5}$]undec-9-yl derivatives. It is another object of the invention to prepare novel homopolymers of 4-oxatetracyclo[6.2.1.0$^{2,7}$.0$^{3,5}$]undec-9-yl unsaturated derivatives. It is a further object to provide novel compositions which can be cross-linked at various stages of processing to yield complex dimensional structures. A still further object of the invention is to provide resins polymerized substantially through the ethylenically unsaturated group of the 4-oxatetracyclo[6.2.1.0$^{2,7}$.0$^{3,5}$]-undec-9-yl unsaturated derivatives. Another object of the invention is to provide resins polymerized substantially through the ethylenically unsaturated group and cross-linked through the epoxy group of the 4-oxatetracyclo-[6.2.1.0$^{2,7}$.0$^{3,5}$]undec-9-yl unsaturated derivatives. Another object of the invention is to provide novel compositions obtained by the reaction of the product resulting from the initial polymerization through the olefinic linkage of the 4-oxatetracyclo[6.2.1.0$^{2,7}$.0$^{3,5}$]undec-9-yl unsaturated derivatives and an active organic hardener. A further object of the invention is to provide novel polymers obtained by the reaction of 4-oxatetracyclo[6.2.1.0$^{2,7}$.0$^{3,5}$]-undec-9-yl unsaturated derivatives and a polymerizable unsaturated monomer having at least one ethylenically unsaturated, polymerizable group. A yet further object is to provide novel compositions obtained by the reaction of the product resulting from the initial polymerization of 4-oxatetracyclo[6.2.1.0$^{2,7}$.0$^{3,5}$]undec-9-yl unsaturated derivatives with polymerizable unsaturated monomers having at least one ethylenically unsaturated polymerizable group and an active organic hardener. Other objects will become apparent to those skilled in the art in light of the instant specification.

In a broad aspect, the invention pertains to the novel and useful compositions of the invention characterized by the following general formula:

I.

wherein Y can represent the following radicals: halo, R—O—,

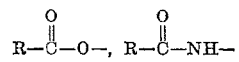

and R'SO$_2$—; wherein R represents a monovalent hydrocarbon radical such as alkyl, alkenyl, cycloaliphatic rings, aromatic rings, and the like; with the proviso that when R in the R—O— group is alkenyl, the ethylenically unsaturated carbon-to-carbon bond is at least one carbon atom removed from the ether oxygen atom, i.e., —O—; and wherein R' represents a saturated hydrocarbon radical or an aromatic radical. The cycloaliphatic rings can be saturated and unsaturated. Preferred cycloaliphatic rings are those containing from five to seven carbon atoms in the ring. The aliphatic hydrocarbon chains can be straight or branched, saturated or unsaturated, said chains preferably containing from one to eighteen carbon atoms.

With reference to Formula I supra, illustrative Y variables include, among others, chloro, bromo, methoxy, ethoxy, isopropoxy, tertiary-butoxy, n-hexoxy, n-decoxy, 2-propenyloxy, 3-butenyloxy, 2-methyl - 4-pentenyloxy, 5-hexenyloxy, 5-decenyloxy, cyclopentoxy, 2-cyclopentenyloxy, cyclohexoxy, 3-cyclohexenyloxy, cycloheptoxy, 4-cycloheptenyloxy, phenoxy, benzyloxy, formyloxy, acetyloxy, n-hexanoyloxy, 5-methyl-hexanoyloxy, n-dodecanoyloxy, acryloyloxy, 3-propenoxyloxy, 6-heptenoyloxy, 9-heptadecenoyloxy, benzoyloxy, cyclohexanecarbonyloxy, 3-cyclohexenecarbonyloxy, cyclopentanecarbonyloxy, 2-cyclopentenecarbonyloxy, cyclopentanecarbonyloxy, 2-cyclopentenecarbonyloxy, cycloheptanecarbonyloxy, 4-cycloheptenecarbonyloxy, alkyl substituted-cyclohexanecarbonyloxy, alkyl substituted-cyclopentanecarbonyloxy, alkyl substituted-cyclopentenecarbonyloxy, formamido, acetamido, propionamido, heptanamido, heptadecanamido, acrylamido, 2-butenamido, 3-pentenamido, 9-decenamido, benzamido, cyclohexylformamido, 3-cyclohexenylformamido, alkyl substituted-cyclohexylformamido, alkyl substituted-3-cyclohexenylformamido, methylsulfonyl, ethylsulfonyl, propylsulfonyl, n-hexylsulfonyl, n-octadecylsulfonyl, methoxyethylsulfonyl, ethoxyethylsulfonyl, n-hexoxyethylsulfonyl, n-octoxyoctylsulfonyl, n-nonoxynonylsulfonyl, phenylsulfonyl, phenylethylsulfonyl, cyclohexylsulfonyl, cyclopentylsulfonyl, naphthylsulfonyl, and the like. Representative R' radicals include for instance, ethyl, propyl, butyl, amyl and the like.

Illustrative subclasses of the monoepoxides include, for example, alkyl 4-oxatetracyclo[6.2.1.0$^{2,7}$.0$^{3,5}$]undec-9-yl ethers,
alkenyl 4-oxatetracyclo[6.2.1.0$^{2,7}$.0$^{3,5}$]undec-9-yl ethers,
cycloalkyl 4-oxatetracyclo[6.2.1.0$^{2,7}$.0$^{3,5}$]undec-9-yl ethers,
cycloalkenyl 4-oxatetracyclo[6.2.1.0$^{2,7}$.0$^{3,5}$]undec-9-yl ethers,
aryl 4-oxatetracyclo[6.2.1.0$^{2,7}$.0$^{3,5}$]undec-9-yl ethers,
4-oxatetracyclo[6.2.1.0$^{2,7}$.0$^{3,5}$]undec-9-yl alkanotes,
4-oxatetracyclo[6.2.1.0$^{2,7}$.0$^{3,5}$]undec-9-yl alkenoates,
4-oxatertacyclo[6.2.1.0$^{2,7}$.0$^{3,5}$]undec-9-yl cycloalkane-carboxylates,
4-oxatetracyclo[6.2.1.0$^{2,7}$.0$^{3,5}$]undec-9-yl cycloalkene-carboxylates,
4-oxatetracyclo[6.2.1.0$^{2,7}$.0$^{3,5}$]undec-9-yl benzoates,
N-(4-oxatetracyclo[6.2.1.0$^{2,7}$.0$^{3,5}$]undec-9-yl)-alkanamides,
N-(4-oxatetracyclo[6.2.1.0$^{2,7}$.0$^{3,5}$]undec-9-yl)-alkenamides,
N-(4-oxatetracyclo[6.2.1.0$^{2,6}$.0$^{3,5}$]undec-9-yl)-cycloalkanecarboxamides,
N-(4-oxatetracyclo[6.2.1.0$^{2,7}$.0$^{3,5}$]-undec-9-yl)cycloalkenecarboxamides,
alkyl 4-oxatetracyclo[6.2.1.0$^{2,7}$.0$^{3,5}$]undec-9-yl sulfones,
cycloalkyl 4-oxatetracyclo[6.2.1.0$^{2,7}$.0$^{3,5}$]undec-9-yl sulfones,
and the like.

Specific examples of monoepoxides of the invention include for instance,
4-oxatetracyclo[6.2.1.0$^{2,7}$.0$^{3,5}$]-9-bromoundecane,
methyl 4-oxatetracyclo[6.2.1.0$^{2,7}$.0$^{3,5}$]undec-9-yl ether,
ethyl 4-oxateracyclo[6.2.1.0$^{2,7}$.0$^{3,5}$]undec-9-yl ether,
4-oxatetracyclo[6.2.1.0$^{2,7}$.0$^{3,5}$]undec-9-yl n-propyl ether,
n-amyl 4-oxatetracyclo[6.2.1.0$^{2,7}$.0$^{3,5}$]undec-9-yl ether,
n-hexyl 4-oxatetracyclo[6.2.1.0$^{2,7}$.0$^{3,5}$]undec-9-yl ether,
n-heptyl 4-oxatetracyclo[6.2.1.0$^{2,7}$.0$^{3,5}$]undec-9-yl ether,
n-decyl 4-oxatetracyclo[6.2.1.0$^{2,7}$.0$^{3,5}$]undec-9-yl ether,
n-dodecyl 4-oxateracyclo[6.2.1.0$^{2,7}$.0$^{3,5}$]undec-9-yl ether,
2-ethylhexyl 4-oxatetracyclo[6.2.1.0$^{2,7}$.0$^{3,5}$]undec-9-yl ether,
allyl 4-oxatetracyclo[6.2.1.0$^{2,7}$.0$^{3,5}$]undec-9-yl ether,
crotyl 4-oxatetracyclo[6.2.1.0$^{2,7}$.0$^{3,5}$]undec-9-yl ether,
3-butenyl 4-oxatetracyclo[6.2.1.0$^{2,7}$.0$^{3,5}$]undec-9-yl ether,
5-hexenyl 4-oxatetracyclo[6.2.1.0$^{2,7}$.0$^{3,5}$]undec-9-yl ether,
cyclopentyl 4-oxatetracyclo[6.2.1.0$^{2,7}$.0$^{3,5}$]-undec-9-yl ether,
2-cyclopentyl 4-oxatetracyclo[6.2.1.0$^{2,7}$.0$^{3,5}$]undec-9-yl ether,
3-cyclopentyl 4-oxatetracyclo[6.2.1.0$^{2,7}$.0$^{3,5}$]undec-9-yl ether,
cyclohexyl 4-oxatetracyclo[6.2.1.0$^{2,7}$.0$^{3,5}$]undec-9-yl ether,
cycloheptyl 4-oxatetracyclo[6.2.1.0$^{2,7}$.0$^{3,5}$]undec-9-yl ether,
4-cycloheptenyl 4-oxatetracyclo[6.2.1.0$^{2,7}$.0$^{3,5}$]undec-9-yl ether,
4-oxatetracyclo[6.2.1.0$^{2,7}$.0$^{3,5}$]undec-9-yl phenyl ether,
benzyl 4-oxatetracyclo[6.2.1.0$^{2,7}$.0$^{3,5}$]undec-9-yl ether
and the like; epoxy esters such as
4-oxatetracyclo[6.2.1.0$^{2,7}$.0$^{3,5}$]undec-9-yl acetate,
4-oxatetracyclo[6.2.1.0$^{2,7}$.0$^{3,5}$]undec-9-yl propionate,
4-oxatetracyclo[6.2.1.0$^{2,7}$.0$^{3,5}$]undec-9-yl butyrate,
4-oxatetracyclo[6.2.1.0$^{2,7}$.0$^{3,5}$]undec-9-yl valerate,
4-oxatetracyclo[6.2.1.0$^{2,7}$.0$^{3,5}$]undec-9-yl caproate,
4-oxatetracyclo[6.2.1.0$^{2,7}$.0$^{3,5}$]undec-9-yl oenanthate,
4-oxatetracyclo[6.2.1.0$^{2,7}$.0$^{3,5}$]undec-9-yl caprylate,
4-oxatetracyclo[6.2.1.0$^{2,7}$.0$^{3,5}$]undec-9-yl pelargonate,
4-oxatetracyclo[6.2.1.0$^{2,7}$.0$^{3,5}$]undec-9-yl caprate,
4-oxatetracyclo[6.2.1.0$^{2,7}$.0$^{3,5}$]undec-9-yl undecanoate,
4-oxatetracyclo[6.2.1.0$^{2,7}$.0$^{3,5}$]undec-9-yl laurate,
4-oxatetracyclo[6.2.1.0$^{2,7}$.0$^{3,5}$]undec-9-yl benzoate,
4-oxatetracyclo[6.2.1.0$^{2,7}$.0$^{3,5}$]undec-9-yl phenylacetate,
4-oxatetracyclo[6.2.1.0$^{2,7}$.0$^{3,5}$]undec-9-yl o-toluate,
4-oxatetracyclo[6.2.1.0$^{2,7}$.0$^{3,5}$]undec-9-yl p-toluate,
4-oxatetracyclo[6.2.1.0$^{2,7}$.0$^{3,5}$]undec-9-yl m-toluate,
4-oxatetracyclo[6.2.1.0$^{2,7}$.0$^{3,5}$]undec-9-yl acrylate,
4-oxatetracyclo[6.2.1.0$^{2,7}$.0$^{3,5}$]undec-9-yl crotonate,
4-oxatetracyclo[6.2.1.0$^{2,7}$.0$^{3,5}$]undec-9-yl angelate,
4-oxatetracyclo[6.2.1.0$^{2,7}$.0$^{3,5}$]undec-9-yl tiglate,
4-oxatetracyclo[6.2.1.0$^{2,7}$.0$^{3,5}$]undec-9-yl undecylenate,
4-oxatetracyclo[6.2.1.0$^{2,7}$.0$^{3,5}$]undec-9-yl cyclopentanecarboxylate,
4-oxatetracyclo[6.2.1.0$^{2,7}$.0$^{3,5}$]undec-9-yl 2-cyclopentenecarboxylate,
4-oxatertacyclo[6.2.1.0$^{2,7}$.0$^{3,5}$]undec-9-yl cyclohexanecarboxylate,
4-oxatetracyclo[6.2.1.0$^{2,7}$.0$^{3,5}$]undec-9-yl 3-cyclohexenecarboxylate,
and the like; epoxy amides such as an
N-(4-oxatetracyclo[6.2.1.0$^{2,7}$.0$^{3,5}$]undec-9-yl)acetamide,
N-(4-oxatetracyclo[6.2.1.0$^{2,7}$.0$^{3,5}$]undec-9-yl)-propionamide,
N-(4-oxatetracyclo[6.2.1.0$^{2,7}$.0$^{3,5}$]undec-9-yl)valeramide,
N-(4-oxatetracyclo[6.2.1.0$^{2,7}$.0$^{3,5}$]undec-9-yl)-caproamide,
N-(4-oxatetracyclo[6.2.1.0$^{2,7}$.0$^{3,5}$]undec-9-yl)-heptanamide,
N-(4-oxatetracyclo[6.2.1.0$^{2,7}$.0$^{3,5}$]undec-9-yl)-octanamide,
N-(4-oxatetracyclo[6.2.1.0$^{2,7}$.0$^{3,5}$]undec-9-yl)-nonanamide,
N-(4-oxatetracyclo[6.2.1.0$^{2,7}$.0$^{3,5}$]undec-9-yl)-acrylamide,
N-(4-oxatetracyclo[6.2.1.0$^{2,7}$.0$^{3,5}$]undec-9-yl)-butenamide,
N-(4-oxatetracyclo[6.2.1.0$^{2,7}$.0$^{3,5}$]undec-9-yl)-10-undecenamide,
N-(4-oxateracyclo[6.2.1.0$^{2,7}$.0$^{3,5}$]undec-9-yl)-cyclohexanecarboxamide,
N-(4-oxatetracyclo[6.2.1.0$^{2,7}$.0$^{3,5}$]undec-9-yl)cyclopentanecarboxamide,
N-(4-oxatetracyclo[6.2.1.0$^{2,7}$.0$^{3,5}$]undec-9-yl)cycloheptanecarboxyamide,
N-(4-oxatetracyclo[6.2.1.0$^{2,7}$.0$^{3,5}$]undec-9-yl)-3-cyclohexenecarboxyamide
and the like, epoxy sulfones such as,
methyl 4-oxatetracyclo[6.2.1.0$^{2,7}$.0$^{3,5}$]undec-9-yl sulfone,
ethyl 4-oxatetracyclo[6.3.1.0$^{2,7}$.0$^{3,5}$]undec-9-yl sulfone,
4-oxatetracyclo[6.2.1.0$^{2,7}$.0$^{3,5}$]undec-9-yl n-propyl sulfone,
isopropyl 4-oxatetracyclo[6.2.1.0$^{2,7}$.0$^{3,5}$]undec-9-yl sulfone,
n-butyl 4-oxatetracyclo[6.2.1.0$^{2,7}$.0$^{3,5}$]undec-9-yl sulfone,
n-hexyl 4-oxatetracyclo[6.2.1.0$^{2,7}$.0$^{3,5}$]undec-9-yl sulfone,
n-dodecyl 4-oxatetracyclo[6.2.1.0$^{2,7}$.0$^{3,5}$]undec-9-yl sulfone,
benzyl 4-oxatetracyclo[6.2.1.0$^{2,7}$.0$^{3,5}$]undec-9-yl sulfone,
4-oxatetracyclo[6.2.1.0$^{2,7}$.0$^{3,5}$]undec-9-yl phenethyl sulfone,
cyclohexyl 4-oxatetracyclo[6.2.1.0$^{2,7}$.0$^{3,5}$]undec-9-yl sulfone,
cyclopentyl 4-oxatetracyclo[6.2.1.0$^{2,7}$.0$^{3,5}$]undec-9-yl sulfone,
and the like.

The novel monoepoxides of the invention can be prepared by the epoxidation of the tricyclo[5.2.1.0$^{2,6}$]-3-decen-8-yl radical of the corresponding olefinic precursor. For example, alkyl tricyclo[5.2.1.0$^{2,6}$]-3-decen-8-yl ethers, tricyclo[5.2.1.0$^{2,6}$]-3-decen-8-yl cycloalkanecarboxylates, alkyl tricyclo[5.2.1.0$^{2,6}$]-3-decen-8-yl sulfones and the like, can be reacted with a solution of peracid, e.g., perbenzoic acid, perproprionic acid, peracetic acid, and the like, in an inert normally-liquid organic medium such as ethyl acetate, acetone, butyl acetate, and the like, at a temperature in the range of from about 0° C. to about 100° C., preferably from about 25° C. to about 80° C., for a period of time sufficient to introduce oxirane oxygen at the site of the carbon-to-carbon double bond of the tricyclo[5.2.1.0²,⁶]-3-decen-8-yl radical. The quantity of peracid consumed during the course of the reaction can be readily determined by well-known procedures. To effect substantially complete epoxidation of the tricyclo[5.2.1.0²,⁶]-3-decen-8-yl radical, at least a stoichiometric quantity of peracid per carbon-to-carbon double bond of said radical should be employed. If, however, other carbon-to-carbon double bonds are present in a radical of the compound, other than the tricyclo-[5.2.1.0²,⁶]-3-decen-8-yl radical, only a stiochiometric quantity or less per carbon to carbon double bond of the tricyclo[5.2.1.0²,⁶]-3-decen-8-yl radical is used to introduce the oxirane oxygen in the tricyclo[5.2.1.0²,⁶]-3-decen-8-yl radical. The inert normally-liquid organic vehicle and acid by-product can be recovered from the reaction product mixture, for example, by distillation under reduced pressure. If desired, the residue product can be subjected to fractional distillation, crystallization, and the like to obtain the monoepoxide product in high purity.

The unsaturated starting compounds which are used in the preparation of the monoepoxides of the invention can be prepared, for example, by the addition of compounds such as alkenoic acids, alkenols, cycloalkanols, cycloalkenols, cycloalkanoic acids, alkanamides, aryl mercaptans, alkyl mercaptans, hydrochloric acid, and the like, to dicyclopentadiene, and heating the resulting mixture, e.g., about 0° C., and lower, to about 150° C., and higher. The reaction is conducted in the presence of a small quantity of inorganic acidic catalyst such as sulfuric acid, boron trifluoride, or boron trifluoride complexes with water, ether, amines, and the like. The resulting reaction mixture can be washed with water and soda solution, dried, and distilled under reduced pressure to thus recover the desired unsaturated product.

The novel monoepoxides of the invention are useful as modifying and plasticizing agents for various synthetic condensation resins and are also useful as stabilizers for various synthetic resins. Due to the presence of the vicinal epoxy group

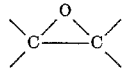

the novel compounds of the invention possess useful solvent properties. For example, they are compatible with many vinyl chloride and vinylidene chloride resins. Accordingly, the compounds of the invention can be used as plasticizers for these and other resins. By incorporating into the resin from about 5 to 50 percent by weight of these novel epoxides, a plasticized product is obtained which possesses useful resilient and flexible characteristics. The vinyl halide resins which can be satisfactorily plasticized by the compounds of this invention are, for example, poly(vinyl chloride), vinyl chloride-vinyl acetate copolymers, vinyl chloride-acrylonitrile copolymers, vinyl chloride-vinylidene chloride-acrylonitrile copolymers and the like. The compounds of this invention may be used alone or in conjunction with the conventional plasticizers. In addition to their use as plasticizers, the compounds of this invention can be employed as stabilizers for chlorine-containing resins where they are effective even at low concentrations.

Of particular significance, the novel 4-oxatetracyclo-[6.2.1.0²,⁷.0³,⁵]undec-9-yl unsaturated derivatives of the invention are highly useful in the preparation of polymerized products. The 4-oxatetracyclo[6.2.1.0²,⁷.0³,⁵]undec-9-yl unsaturated derivatives are characterized by the presence of one vicinal epoxy group

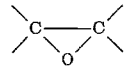

and one ethylenic group, >C=C<. The presence of two functional groups in the one molecule makes them highly useful for the preparation of cross-linked resin structures. For example, the novel epoxides can be polymerized through the ethylenic groups with each other or with other vinyl monomers through the ethylenic grouping in the presence of a suitable peroxide catalyst to form soluble, fusible, linear polymers and further cured with an active organic hardener or cross-linked through the epoxide grouping in the presence of basic or acidic epoxide catalysts if desired, to form insoluble, infusible compositions. In another manner, the 4-oxatetracyclo-[6.2.1.0²,⁷.0³,⁵]undec-9-yl unsaturated derivatives of the invention can be polymerized through the epoxide groups with or without the presence of a suitable basic or acidic epoxide catalyst and cross-linked in the presence of suitable peroxide catalyst through the unsaturated ethylenic group to form insoluble, infusible compositions.

It should be noted that at this time that the expression "peroxide catalysts" as used herein, refers to those catalysts, hereinafter described, used in the polymerization of the compounds of the invention through the available unsaturated ethylenic groups. Moreover, the expression "basic or acidic epoxide catalyst" as used herein, refers to those catalysts, hereinafter described, used in the polymerization of the compounds of the invention through the available epoxy groups,

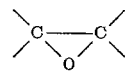

The expression "active organic hardeners" indicates those compounds which when reacted with available epoxy groups cause a curable system comprising polyepoxide(s) to become a thermosetting or thermoset resin in accordance with the teachings of the instant specification. Representative active organic hardeners include polycarboxylic acids, polycarboxy polyesters, polycarboxylic anhydrides, polyols, e.g., polyhdric phenols and polyhydric alcohols, polyfunctional amines, polythiols, polyisocyanates, polyisothiocyanates, polyacryl halides and the like.

The 4-oxatetracyclo[6.2.1.0²,⁷.0³,⁵]undec-9-yl unsaturated derivatives are those compounds described in Formula I, supra, having an ethylenic unsaturated hydrocarbon radical attached to the functional groups such as —O—,

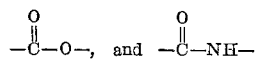

attached in the nine-carbon position of the 4-oxatetracyclo[6.2.1.0²,⁷.0³,⁵]undec-9-yl radical. Typical subclasses of 4-oxatetracyclo[6.2.1.0²,⁷.0³,⁵]undec-9-yl unsaturated derivatives of the invention include, for instance,
alkenyl 4 - oxatetracyclo[6.2.1.0²,⁷.0³,⁵]undec-9-yl ethers wherein the ethylenic unsaturation is at least one carbon removed from the ether oxygen, i.e., —O—,
cycloalkenyl 4-oxatracyclo[6.2.1.0²,⁷.0³,⁵]undec-9-yl ethers,
4-oxatetracyclo[6.2.1.0.²,⁷.0³,⁵]undec-9-yl alkenoates,
N-(4-oxatetracyclo[6.2.1.0²,⁷.0³,⁵]undec-9-yl) alkenamides,
N-(4-oxatetracyclo[6.2.1.0²,⁷.0³,⁵]undec-9-yl)cycloalkenecarboxamides,
and the like.
Specific 4-oxatetracyclo[6.2.1.0²,⁷.0³,⁵]undec-9-yl unsaturated derivatives include, for instance,
allyl 4-oxatetracyclo[6.2.1.0²,⁷.0³,⁵]undec-9-yl ether,
crotyl 4-oxatetracyclo[6.2.1.0²,⁷.0³,⁵]undec-9-yl ether,
3-butenyl 4-oxatetracyclo[6.2.1.0²,⁷.0³,⁵]undec-9-yl ether,
5-hexenyl 4-oxatetracyclo[6.2.1.0.²,⁷.0³,⁵]undec-9-yl ether,
2-cyclopentenyl 4-oxatetracyclo[6.2.1.0²,⁷.0³,⁵]undec-9-yl ether,
3-cyclohexenyl 4-oxatetracyclo[6.2.1.0.²,⁷.0³,⁵]undec-9-yl ether, 4-oxatetracyclo[6.2.1.0$^{2,7}$.0$^{3,5}$]undec-9-yl acrylate,
4-oxatetracyclo[6.2.1.0$^{2,7}$.0$^{3,5}$]undec-9-yl crotonate,
4-oxatetracyclo[6.2.1.0$^{2,7}$.0$^{3,5}$]undec-9-yl undecylenate,
4-oxatetracyclo[6.2.1.0$^{2,7}$.0$^{3,5}$]undec-9-yl 3-cyclohexene-carboxylate,
N-(4-oxatetracyclo[6.2.1.0$^{2,7}$.0$^{3,5}$]undec-9-yl)acrylamide
N-(4-oxatetracyclo[6.2.1.0$^{2,7}$.0$^{3,5}$]undec-9-yl)-3-butenamide,
N-(4-oxatetracyclo[6.2.1.0$^{2,7}$.0$^{3,5}$]undec-9-yl)-10-undecanamide,
N-(4-oxatetracyclo[6.2.1.0$^{2,7}$.0$^{3,5}$]undec-9-yl)-3-cyclohexenecarboxamide and the like.

Accordingly, the first preferred embodiment of the invention is directed to novel homopolymeric products which are prepared by effecting the polymerization of 4-oxotetracyclo-[6.2.1.0$^{2,7}$.0$^{3,5}$]undec-9-yl unsaturated derivatives. A useful subclass of the homopolymeric products of the invention is obtained by the polymerization of 4-oxatetracyclo[6.2.1.0$^{2,7}$.0$^{3,5}$]undec-9-yl unsaturated derivatives through the epoxy group in the presence of an acidic or basic epoxide catalyst, described hereinafter. The novel polymeric products of this subclass are characterized by the presence of free ethylenic groups. The useful polymeric products obtained can range from viscous liquids to hard, linear, fusible resins. Additionally, the polymerized products of the above subclass can be further polymerized through the available ethylenic groups in the presence of a peroxide catalyst, hereinafter described, to obtain a hard, cured resin. A second useful subclass of the homopolymeric products of the invention is obtained by the polymerization of 4-oxatetracyclo[6.2.1.0$^{2,7}$.0$^{3,5}$]undec-9-yl unsaturated derivatives through the ethylenically unsaturated group in the presence of a peroxide catalyst, described hereinafter. The novel polymeric products of the second subclass are characterized by the presence of free epoxy groups. The novel polymeric products of the second subclass are characterized by the presence of free epoxy groups. These polymeric products are useful, fusible compositions. Additionally, the polymerized products of this subclass can be further polymerized through the available epoxy groups in the presence of an acidic or basic epoxy catalyst, hereinafter described. These latter polymeric products are useful, infusible compositions.

The second embodiment of the invention is directed to novel copolymeric products of 4-oxatetracyclo 6.2.1.0$^{2,7}$.0$^{3,5}$]-undec-9-yl unsaturated derivatives. A useful subclass of the copolymers of the invention is obtained by the polymerization of 4-oxatetracyclo[6.2.1.0$^{2,7}$.0$^{3,5}$]undec-9-yl unsaturated derivatives with vinyl monomers which contain at least one polymerizable ethylenic unsaturated bond, through the ethylenicallyunsaturated group in the presence of a peroxide catalyst, described hereinafter. Additionally, the polymerized products of the above subclass can be further polymerized through the available epoxy groups in the presence of an acid or base epoxide catalyst. A second useful subclass of the copolymeric products of the invention is obtained by the homopolymerization of 4-octatetracyclo[6.2.1.0$^{2,7}$0$^{3,5}$]-undec-9-yl unsaturated derivatives through the epoxy group in the presence of an acidic or basic epoxide catalyst and further polymerization with vinyl monomers which contain at least one polymerizable ethylenically unsaturated bond, through the ethylenically unsaturated group in the presence of a peroxide catalyst. Suitable polymerizable vinyl monomers include the aromatic monomers which contain ethylenically unsaturated side chains such as styrene, chlorostyrene, allylstyrene and the like. Other typical groups of ethylenically unsaturated monomers include vinyl chloride, vinyl bromide, vinyl fluoride, acrylonitrile, methacrylonitrile, vinylidene chloride, vinylidene bromide, vinylidene fluoride. Other typical groups of polymerizable ethylenically unsaturated monomers include: a vinyl ester of an aliphatic monocarboxylic acid, for example, vinyl acetate, vinyl butyrate, vinyl chloroacetate, vinyl formate, vinyl caproate, and the like; unsaturated aliphatic esters of a saturated aliphatic polybasic acid or an unsaturated aliphatic ester of an unsaturated aliphatic polybasic acid or unsaturated esters of dibasic aromatic acids for example, the divinyl, dialkyl, and dimethallyl esters of oxalic acid, maleic acid, citric acid, and tartaric acid; the divinyl, diallyl and methallyl esters of phthalic acid, isophthalic acid, terephthalic acid, and naphthalenedicarboxylic acid; monomers having a conjugated system of ethylenic double bonds, for instance 1,3-butadiene, isoprene, 2,3-dimethyl-1,3-butadiene, 1-acetoxy-butadiene, 2-cyano-1,3-butadiene and the like. Other suitable polymerizable monomers include unsaturated aliphatic ethers of saturated polyhydric alcohols, for instance, divinyl, dialkyl and dimethallyl ethers of glycol and the like. The polymerization products of this embodiment can range from a viscous liquid to a solid.

The third embodiment of the invention is directed to novel polymeric products resulting from the polymerization of 4-oxatetracyclo[6.2.1.0$^{2,7}$.0$^{3,5}$]undec-9-yl unsaturated derivatives with other epoxides through the epoxy group in the presence of an acidic or basic epoxide catalyst, described hereinafter. The resulting polymeric compositions contain a plurality of ethylenic groups. Suitable epoxides which can be reacted with 4-oxatetracyclo[6.2.1.0$^{2,7}$.0$^{3,5}$]undec-9-yl unsaturated derivatives include: Polyepoxides such as limonene dioxide, 4-vinylcyclohexene dioxide, dicyclopentadiene dioxide, divinylbenzene dioxide, 3,4-epoxy-6-methylcyclohexylmethyl 3,4-epoxy-6-methylcyclohexanecarboxylate, diethylene glycol bis(3,4-epoxycyclohexanecarboxylate), bis(2,3-epoxycyclopentyl) ether, bis(3,4-epoxycyclohexylmethyl) pimelate, 1,1,1-trimethylolpropane tris(3,4-epoxy cyclohexanecarboxylate), the polyglycidyl polyethers of polyhydric phenols and the like. The resulting products of this embodiment are useful fusible compositions. Additionally, the polymeric products of this embodiment can be further polymerized through the free ethylenic groups in the presence of an acidic or basic epoxide catalyst to obtain a cross-linked, insoluble, infusible composition.

The fourth embodiment of the invention is directed to novel polymeric products resulting from the polymerization of vinyl monomers which contain at least one polymerizable ethylenically unsaturated bond, as described in the second embodiment with the polymeric product of the third embodiment, i.e., the polymerization of 4-oxatetracyclo[6.2.1.0$^{2,7}$.0$^{3,5}$]undec-9-yl unsaturated derivatives with other epoxides, through the epoxy groups. The instant polymerization can be conducted in the presence of an acidic or basic epoxide catalyst to obtain a cross-linked, infusible polymeric product.

The fifth embodiment of the invention is directed to a novel polymeric product resulting from the polymerization of the copolymer of the second embodiment, first subclass, and the epoxides, as described in the third embodiment, in the presence of an acidic or basic epoxide cataylst, to obtain an infusible resin.

The sixth embodiment pertains to novel curable, partially cured and cured polymeric products obtained from the reaction of the homopolymer of 4-oxatetracyclo-[6.2.1.0$^{2,7}$.0$^{3,5}$]undec-9-yl unsaturated derivative polymerized through the ethylenically unsaturated group (second subclass of the first embodiment) with an active organic hardener in the presence of an acidic or basic epoxide catalyst, described hereinafter. The resulting products are useful partially cured and cured compositions.

The seventh embodiment pertains to novel curable, partially cured, and cured polymeric products obtained by the reaction of the copolymer of 4-oxatetracyclo-[6.2.1.0$^{2,7}$.0$^{3,5}$]undec-9-yl unsaturated derivatives and vinyl monomers which contain at least one polymerizable ethylenically unsaturated bond, said copolymer polymerized through the available ethylenically unsaturated bonds (described in the second embodiment, first subclass) with an active organic hardener, in the presence of an acidic or basic epoxide catalyst, described hereinafter. The resulting products are useful partially cured and cured compositions.

Where an acidic or basic catalyst is employed in this invention, it is advantageous to add said catayIst to the component(s) at a temperature range, for example, of from about 10° C. to about 100° C., preferably with agitation, to insure homogeneity of the resulting admixture. Catalyst concentrations can be varied over a broad range and can be selected on the basis of the rate of polymerization desired and the polymerization temperature to be used. It has been found that catalyst concentrations from about 0.005, or lower, to 15 weight percent, or higher, preferably from about 0.01 to 5 weight percent, based on the weight of the epoxide component(s) used can be employed. The period of time required for the polymerization reaction can range from several minutes to twenty-four hours, and longer, depending on concentration of catalyst, temperature, the particluar catalyst employed, the epoxide components(s), and other factors.

Typical acidic and basic epoxide catalysts which can be employed include, for example, the metal halide Lewis acids, e.g., boron trifluoride, aluminum chloride, zinc chloride, stannic chloride, ferric chloride, boron trifluoride-piperidine complex, boron trifluoride - 1,6-hexanediamine complex, boron trifluoride - monoethylamine complex, boron trifluoride-dimethyl ether complex, boron trifluoride-diethyl ether complex, boron trifluoride - di - propyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted - benzenesulfonic acids, and the like; and the alkali metal hydroxides, e.g., sodium hydroxide, potassium hydroxide, and the like.

Where peroxide catayIsts are employed in the polymerization through the ethylenically unsaturated groups, catalyst concentrations can be varied over a broad range and can be selected on the basis of the rate of polymerization desired and the polymerization temperature to be used. The preferred catalyst concentration can vary from 0.1 weight percent, or lower, to 5.0 weight percent, or higher, based on the total weight of the ethylenic component(s) employed. The period of time required for the polymerization reaction can range from several minutes to 40 hours, and longer, depending on concentration of catalyst, temperature, the catalyst employed, the ethylenic component(s) employed, and other factors. The temperature employed in the polymerization can vary from 0° C. to about 80° C. Preferred temperatures range from 40° C. to 80° C. Additionally, the instant polymerization reaction can be carried out in solution, emulsion, suspension, and bulk systems. Examples of organic media useful in a solution polymerization include acetone, tetrahydrofuran, dimethylformamide, benzene, and the like.

The peroxide catalysts used in the invention can be exemplified by acetyl peroxide, benzoyl peroxide, benzoylacetyl peroxide, tertitary-butyl hydroperoxide, tertiary-butyl peracetate, azo-bis(isobutyronitrile), and the like.

The curable compositions of the sixth and seventh embodiments of the invention can be prepared by mixing the corresponding homopolymer or copolymer, used in said embodiments, with the active organic hardener(s), preferably under agitation, so as to obtain a homogeneous mixture. The order of addition of the components does not appear to be critical. When a solid or highly viscous component or active organic hardener is employed, heating is advantageous in facilitating the formation of a solution. In preparing homogeneous mixtures, it is advantageous to employ a temperature as high as the melting point of the highest melting component contained in the curable mixture. In any event, the application of heat should not be prolonged to the extent that appreciable curing takes place.

The curable compositions of the sixth and seventh embodiments of the invention can be partially cured or fully cured by maintaining the temperature in the range of from about 10° C., and lower, to about 250° C., and higher, and preferably from about 25° C. to about 200° C. A higher curing temperature generally will provide a thermosetting or thermoset resin in less time than a lower curing temperature. One preferable method is to heat the curable compositions to a temperature within the range from about 50° C. to 150° C. to first partially cure the composition. A temperature from about 100° C. to 200° C. then can be used to complete the cure. However, any one or combination of two or more temperatures within the specified range of 10° C. to 250° C. can be employed, if desired, to effect the full cure. For casting purposes the preferred minimum temperature of the normally solid curable compositions is that at which said compositions form a uniform melt, whereas for coatings and the preparation of laminates, the use of solvents will allow the use of lower temperature.

The time for effecting the partial cure or the complete cure will be governed, to an extent, on several factors such as the particular homopolymer of 4-oxatetracyclo-[6.2.1.0$^{2,7}$.0$^{3,5}$] undec-9-yl unsaturated derivative(s) or copolymers employed, the particular active organic hardener(s) employed, the proportions of homopolymer of 4-oxatetracyclo-[6.2.1.0$^{2,7}$.0$^{3,5}$]undec-9-yl unsaturated derivative(s) or copolymers and active organic hardener(s), the inclusion of an active organic hardener modifier, the inclusion of a catalyst, the concentration of the catalyst and/or modifier, the temperature for effecting the cure, and other considerations. In general, the time for effecting the complete cure can vary from several minutes to several days, e.g., from ten minutes to one week, depending upon the correlation of such factors as illustrated above.

The novel curable, partially cured, and cured compositions of the sixth and seventh embodiment of the invention comprises homopolymer or copolymer of 4-oxatetracyclo[6.2.1.0$^{2,7}$.0$^{3,5}$]undec-9-yl unsaturated derivative and polycarboxylic acid in such relative amounts so as to provide from about 0.1 to about 2.0 carboxyl groups, i.e., —COOH groups, of said polycarboxylic acid per epoxy group, i.e.,

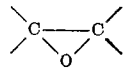

groups, of homopolymer or copolymer epoxide, and preferably from about 0.3 to about 1.2 carboxyl groups per epoxy group.

Rrepresentative polycarboxylic acids which can be employed include, for example, oxalic acid, glutaric acid, suberic acid, alkylsuccinic acids, alkenylsuccinic acids, maleic acid, glutaconic acid, allylmalonic acid, 3-hexynedioic acid, 1,2-cyclohexanedicarboxylic acid, phthalic acid, terephthalic acid, and the like.

Other novel curable, partially cured, and cured compositions of the sixth and seventh embodiments of the invention comprises homopolymer or copolymer of 4-oxatetracyclo-[6.2.1.0$^{2,7}$.0$^{3,5}$]undec-9-yl unsaturated derivative and polycarboxylic acid anhydride in such relative amounts so as to provide from about 0.1 to about 4.0 carboxyl groups of the polycarboxylic acid anhydride per epoxy group and preferably from about 0.8 to about 2.5 carboxyl groups per epoxy group. It should be noted that by the expression "carboxyl groups of the polycarboxylic acid anhydride" is meant the carboxyl groups which would be contained by the corresponding polycarboxylic acid. For example, succinic anhydride does not possess any carboxyl groups per se; however, the corresponding polycarboxylic acid is succinic acid which contains two free carboxyl groups. Thus, succinic anhydride has two carboxyl groups as applied in the above expression. In different language, by the expression "carboxyl groups of polycarboxylic acid anhydride" is meant the carboxyl groups contained in the "hydrated" polycarboxylic acid anhydride.

Illustrative polycarboxylic acid anhydrides include the aliphatic, aromatic and cycloaliphatic acid anhydrides. The preferred anhydrides are the dicarboxylic acid anhydrides and preferably the hydrocarbon dicarboxylic acid anhydrides which include, for example, phthalic anhydride, tetrahydrophthalic anhydride, maleic anhydride, glutaric anhydride, succinic anhydride, nonenylsuccinic anhydride, 1,8-naphthalic anhydride, lower alkyl substituted-bicyclo[2.2.1]hept-5-ene-2,3-dicarboxylic anhydride, methylbicyclo[2.2.1]hept-2-ene - 2,3 - dicarboxylic anhydride, and the like. Polycarboxylic acid anhydrides which have melting points below about 250° C. are satisfactory; those anhydrides possessing melting points below about 200° C. are preferred.

Further novel curable, partially cured, and cured compositions of the sixth and seventh embodiments of the invention comprises homopolymer or copolymer of 4-oxatetracyclo[6.2.1.0$^{2,7}$.0$^{3,5}$]-undec-9-yl unsaturated derivative and polyol in such relative amounts as provide from about 0.1 to about 2.0 hydroxyl groups i.e., —OH groups, of said polyol per epoxy group of said homopolymer or copolymer epoxide, and preferably from about 0.2 to about 1.0 hydroxyl group per epoxy group. By the term "polyol" as used herein including the appended claims, is meant an organic compound having at least two hydroxyl groups, which are alcoholic hydroxyl groups, phenolic hydroxyl groups, or both alcoholic and phenolic hydroxyl groups. The term "polyol" preferably encompasses the polyhydric alcohols and the polyhydric phenols.

Illustrative of the polyols contemplated include, for example, the aliphatic and cycloaliphatic polyhydric alcohols, e.g., ethylene glycol, diethylene glycol, the polyethylene glycols, propylene glycol, the polypropylene glycols, the polyethylenepolypropylene glycols, 1,1,1-trimethylolpropane, the polyvinyl alcohols, the cyclopentanediols, the cyclohexanediols, the lower alkyl substituted-cyclohexanediols; and the polyhydric phenols, e.g., resorcinol, catechol, bis(4-hydroxyphenyl)-2,2-propane, 1,8-naphthalenediol, the polyhydric phenolformadlehyde condensation products, and the like. The alkylene oxide adducts, e.g., ethylene oxide, propylene oxide, etc., of polyhydric alcohols or polyhydric phenols such as those illustrated above also are highly suitable. Polyols having melting points below about 250° C. are desirable; those polyols having melting points below about 200° C. are preferred.

Additional novel curable, partially cured, and cured compositions of the sixth and seventh embodiments of the invention comprises homopolymer or copolymer of 4-oxatetracyclo-[6.2.1.0$^{2,7}$.0$^{3,5}$]undec-9-yl unsaturated derivatives and polycarboxyl polyester in such relative amounts as provide from about 0.1 to about 2.0 carboxyl groups of said polycarboxyl polyester per epoxy group of said homopolymer or copolymer epoxide, and preferably from about 0.3 to about 1.2 carboxyl groups per epoxy group. By the term "polycarboxy polyester," as used herein including the appended claims, is meant a polyester which contains at least two carboxyl groups in the average molecule. The polycarboxy polyesters can be prepared by known condensation procedures, employing mol ratios favoring greater than equivalent amounts of polycarboxylic acid or polycarboxylic acid anhydrides with relation to the polyhydric alcohol. More specifically, the amount of polycarboxylic acid or polycarboxylic acid anhydride which is employed in the esterification reaction should contain more carboxyl groups, collectively, than are required to react with the hydroxyl groups contained in the amount of polyhydric alcohol so that the resulting esterified product, i.e. polycarboxy polyester, contains at least two free carboxyl groups in the average polycarboxy polyester molecule. The polycarboxylic acids, polycarboxylic acid anhydrides, and polyols which can be employed in the preparation of the polycarboxy polyesters have been illustrated previously. The polycarboxy polyesters can be obtained by condensing, in accordance with known procedures, a polyhydric alcohol and a polycarboxylic acid or a polycarboxylic acid anhydride. This condensation reaction can be conducted, for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyester has been obtained.

The invention also contemplates the modification of the properties and characteristics of the partially cured and fully cured compositions (resins) set forth previously in the discussion. Special and highly desirable effects can be imparted to the partially cured and fully cured compositions by incorporating a second active organic hardener (hereinafter termed "modifier") into the curable composition comprising the homopolymer or copolymer of 4-oxatetracyclo[6.2.1.0$^{2,7}$.0$^{3,5}$]undec-9-yl unsaturated derivative and "major" active organic hardener (i.e., polycarboxylic acid, polycarboxylic acid anhydride, polyol, polycarboxy polyester, and the like). The proportions of modifier to "major" active organic hardener are such that the number of reactive groups contained by an amount of the modifier with relation to the number of reactive groups contained by an amount of the "major" active organic hardener will be in a ratio that is less than one. It is to be understood that the term "reactive groups" pertains to groups which are reactive with the epoxy groups contained in the unsaturated epoxide. For instance, to a curable composition comprising the homopolymer or copolymer of 4-oxatetracyclo [6.2.1.0$^{2,7}$.0$^{3,5}$] undec-9-yl unsaturated derivative and polycarboxylic acid, there can be added an amount of a modifier, e.g., polycarboxylic acid anhydride, polycarboxy polyester, polyol, etc., such that the ratio of reactive groups contained by the modifier with respect to the carboxyl groups contained by the polycarboxylic acid is less than one. On this basis the modifier can be considered to be the minor component in relation to the polycarboxylic acid. As a second illustration, if the curable composition comprises a homopolymer or copolymer of 4-oxatetracyclo [6.2.1.0$^{2,7}$.0$^{3,6}$]undec - 9 - yl unsaturated derivative and polyol, an amount of modifier, e.g. polycarboxylic acid, polycarboxy polyester, polycarboxylic acid anhydride, polyisocyanate, polythiol, etc., can be added to said curable mixture such that the ratio of the reactive groups contained by the modifier with respect to the hydroxyl groups contained by the polyol is less than one. Again it will be noted that the modifier is the minor component with respect to the polyol. The modifiers which can be employed are those illustrated previously in the discussion of polycarboxylic acids, polycarboxylic acid anhydrides, polyols, polycarboxy polyesters, etc.

Other curable, partially cured and cured compositions of the sixth and seventh embodiment of the invention comprise homopolymers or copolymers of 4-oxatetracyclo[6.2.1.0$^{2,7}$.0$^{3,5}$]undec-9-yl unsaturated derivatives and a polyfunctional amine in such relative amounts so as to provide from about 0.2 to about 5.0 amino hydrogen atoms of the polyfunctional amine per epoxy group of the unsaturated epoxide, and preferably from about 0.8 to about 2.0 amino hydrogen atoms per epoxy group. By the term "polyfunctional amine" as used herein including the appended claims, is meant an organic amine having at least two active amino hydrogen atoms which can be on the same nitrogen atom or on different nitrogen atoms.

Among the polyfunctional amine subclasses contemplated include the aliphatic amines, aromatic amines, aralkyl amines, cycloaliphatic amines, alkaryl amines, aliphatic polyamines including polyalkylene polyamines, amino-substituted monohydric and polyhydric aliphatic alcohols and phenols, polyamines, addition products of polyamines and low molecular weight epoxides containing oxirane oxygen linked to vicinal carbon atoms, and others.

Illustrative polyfunctional amines include, for example, methylamine, butylamine, 2-ethylhexylamine, aniline, o-hydroxylaniline, meta-, ortho-, and para-phenylenediamines, 1,4-naphthalenediamine, p-menthane-1,8-diamine, decylenediamine, diethylenetriamine, triethylenetetramine, tetraethylenepentamine, dipropylenetriamine, and the like. The polyamines, i.e., those having an average molecular weight range from about 300 to about 10,000 including condensation products of polycarboxylic acids, in particular, hydrocarbon dicarboxylic acids, such as malonic acid, succinic acid, glutaric acid, adipic acid, dilinoleic acid, and the like, with polyamines, particularly diamines, such as ethylenediamine, propylenediamine, butylenediamine and the like are also suitable.

In the following illustrative examples, the examination and description of the resins were conducted at room temperature, i.e., about 24° C.

Example 1

A solution (202 grams) of peracetic acid (28.7 weight percent) in ethyl acetate was added dropwise over a period of 45 minutes to 290 grams of allyl tricyclo [5.2.1.0$^{2,6}$]dec-3-en-8-yl ether at 30° C. After an additional three-hour reaction period at 30° C., an analysis indicated that all of the peracetic acid had been consumed. The reaction product mixture was fed dropwise to a still kettle containing 600 grams of ethylbenzene under reflux at such a pressure as to maintain a kettle temperature of 50° C. The ethyl acetate, acetic acid and some of the ethylbenzene were removed continuously at the still head during the addition. After removal of the remaining ethylbenzene, the reaction product was distilled under reduced pressure. There was obtained 132 grams (84 percent yield) of allyl - 4 - oxatetracyclo[6.2.1.0$^{2,7}$.0$^{3,5}$]undec-9-yl ether, a colorless liquid having the following properties:

Boiling point—116–118° C. at 2 milliliters Hg
Refractive index ($n$ 30/D)—1.5000–1.5004
Purity by epoxide analysis (HBr)—100.5%
Percent carbon—75.22 (calc. 75.68%)
Percent hydrogen—8.89 (calc. 8.79%)

In an analogous manner as the above example 4-oxatetracyclo[6.2.1.0$^{2,7}$.0$^{3,5}$]undec-9-yl propyl ether is prepared.

Example 2

A solution of 19.3 grams of N-(tricyclo[5.2.1.0$^{2,6}$]dec-3-en-8-yl)acrylamide in 80 grams of acetone was heated to 50° C. with stirring to effect solution. To this solution was added 40.7 grams of a 28 weight percent solution of peracetic acid in ethyl acetate over a period of one hour while maintaining the temperature at 50° C. The solution was heated for an additional seven hours at 50° C., at which time, an analysis indicated that 96 percent of the theoretical amount of peracetic acid had reacted. The solution was cooled to −10° C., and filtered to obtain 10 grams of N-(4-oxatetracyclo[6.2.1.0$^{2,7}$.0$^{3,5}$]undec - 9 - yl) acrylamide, a white crystalline solid, M.P. 152° C. Evaporation of the filtrate, cooling, and filtering gave a second crop (4 grams) of crystals. The yield was, therefore, 67 percent of the theoretical.

A portion of the crystalline product, N-(4-oxatetracyclo [6.2.1.0$^{2,7}$.0$^{3,5}$]undec - 9 - yl) acrylamide was recrystallized twice from ethyl acetate to give a white crystalline solid having the following properties:

Melting point—152–3° C.

Percent nitrogen—6.43 (calc. 6.38%)
Percent carbon—70.6% (calc. 71.9%)
Percent hydrogen—7.73% (calc. 7.75%)

The infrared spectrum of the product still contained the bands characteristic of the terminal double bond in the starting material. In addition, there was a strong band at 11.92 microns which is the region characteristic of cis epoxides.

In an analogous manner as the above example, N-(4-oxatetracyclo[6.2.1.0$^{2,7}$.0$^{3,5}$]undec - 9 - yl)propionamide is prepared.

Example 3

A mixture of 258 grams of 3-butenoic acid, 396 grams of tricyclo[5.2.1.0$^{2,5}$]-3,8-decadiene and 25 grams of boron trifluoride-etherate was stirred at 60° C. for five hours. The mixture was cooled, diluted with 300 milliliters of toluene, washed with 250 milliliters of water, then washed with dilute soda solution and again with water. The oil layer recovered was dried over sodium sulfate and distilled under reduced pressure. The ester distilled at 112° C. (1.5 millimeters Hg) as a colorless liquid having a refractive index (D-line) at 30° C. of 1.4972. The yield was 478 grams (73 percent) of tricyclo[5.2.1.0$^{2,6}$]dec-3-en-8-yl 3-butenoate.

*Analysis.*—Calcd. for $C_{14}H_{18}O_2$: C, 77.03; H, 8.31. Found: C, 76.80; H, 8.30.

Example 4

A solution (1025 grams) of peracetic acid (24.1 weight percent) in ethyl acetate was added dropwise with stirring to 394 grams of tricyclo[5.2.1.0$^{2,6}$]dec-3-en-8-yl 3-butenoate at 50° C. over a period of 2 hours. After 2 additional hours at 50° C., the temperature of the reaction mixture was raised to 60° C. and maintained there for an additional 5 hours. At this time, approximately 90 percent of the theoretical amount of peracetic acid was consumed.

The reaction product mixture was fed dropwise into a still kettle containing ethylbenzene refluxing under such a pressure to maintain the kettle temperature at 50° C. Ethyl acetate, acetic acid, excess peracetic acid and some ethylbenzene were removed continuously at the still head throughout the addition. After removal of the ethylbenzene, the reaction product was fractionated to give 218 grams (51 percent) of 4-oxatetracyclo[6.2.1.0$^{2,7}$.0$^{3,5}$] undec-9-yl- 3-butenoate having a boiling point of 120° C. (0.04 millimeters Hg) and a refractive index (D-line) at 30° C. of 1.5001–1.5028. An epoxide analysis (pyridine hydrochloride method) indicated a purity of 95.4%.

Example 5

To 337 grams of tricyclo[5.2.1.0$^{2,6}$]-8-chloro-3-decene which was maintained with stirring at 40° C. by means of an ice-water bath, there was added dropwise over a period of two hours and fifteen minutes 683 grams of a 27.9 weight percent solution of peracetic acid in ethyl acetate. After an additional three hours and fifteen minutes at 40° C., the reaction was essentially complete as indicated by a titration for peracetic acid. The volatiles were removed from the solution by codistillation with ethylbenzene and the residue was fractionated to give 333 grams of 4-oxatetracyclo[6.2.1$^{2,7}$.0$^{3,5}$]-9-chloroundecane having the following properties:

Boiling point—80–82/0.10–0.15 millimeters
Refractive index—n/30D 1.5204–1.5206

*Analysis.*—Calcd. for $C_{10}H_{13}Cl$; C, 65.20; H, 7.09. Found: C, 65.19; H, 6.86.

Example 6 n-Butyl tricyclo[5.2.1.0$^{2,6}$]dec-3-en-8-yl sulfide was prepared in 88.9 percent yield by the addition of n-butyl mercaptan to tricyclo[5.2.1.0$^{2,6}$]-3,8-decadiene. n-Butyl tricyclo[5.2.1.0$^{2,6}$]-dec-3-en-8-yl sulfide was a colorless liquid boiling at 125–127° C. at 2 millimeters Hg and having a refractive index range of 1.5208–1.5224 (N30/D).

*Analysis.*—Calculated for $C_{14}H_{22}S$: S, 14.42%. Found: S, 14.40%.

n-Butyl tricyclo[5.2.1.0$^{2,6}$]dec-3-en-8-yl sulfide was converted to the corresponding sulfone by reaction with a 5 percent excess of peracetic acid solution in ethyl acetate at 0–10° C. The product, n-butyl tricyclo[5.2.1.0$^2$]dec-3-en-8-yl sulfone, which was isolated in 89 percent yield by distillation, was a colorless liquid having a boiling point of 172–173° C. at 3 millimeters Hg and a refractive index range of 1.5185–1.5194 (N30/D).

*Analysis.*—Calculated for $C_{14}H_{22}SO_2$: S, 12.65%. Found: S, 12.59%.

To n-butyl tricyclo[5.2.1.0$^{2,6}$]dec-3-en-8-yl sulfone (442 grams) was added 573 grams of a 28.8 weight percent solution of peracetic acid in ethyl acetate over a one-hour period at 50° C. After an additional 2.25-hour reaction period at 60° C., the consumption of peracetic acid was 97.5 percent of the theoretical. The reaction product was isolated by codistillation of the volatiles with ethylbenzene under reduced pressure followed by stripping at a kettle temperature of 100° C. at 6 millimeters Hg. The product, n-butyl 4-oxatetracyclo[6.2.1.0$^{2,7}$.0$^{3,6}$]undec-9-yl-sulfone, was a pale-yellow liquid having a refractive index of 1.5200 (N30/D).

*Analysis.*—Calculated for $C_{14}H_{22}SO_3$: S, 11.86%. Found: S, 11.57%.

Example 7 n-Dodecyl tricyclo[5.2.1.0$^{2,6}$]dec-3-en-8-yl sulfide was prepared in 80.8 percent yield by the addition of n-dodecyl sulfide to tricyclo[5.2.1.0$^{2,6}$]-3,8-decadiene. n-Dodecyl tricyclo[5.2.1.0$^{2,6}$]dec-3-en-8-yl sulfide was a liquid boiling at 202–208° C. at 2 millimeters Hg and having a refractive index range of 1.4996–1.5009 (N30/D).

*Anaylsis.*—Calculated for $C_{22}H_{38}S$: S, 9.59%. Found: S, 9.56%.

n-Dodecyl tricyclo[5.2.1.0$^{2,6}$]dec-3-en-8-yl sulfide (411 grams) was dissolved in 657 cubic centimeters of ethyl acetate and to this solution was added 657 grams of a 29.8 weight percent solution of peracetic acid in ethyl acetate over a 2-hour period at 0–10° C. The reaction mixture was reduced in volume by removing approximately one half of the ethyl acetate, cooling said reaction mixture in a brine bath (−10° C.), and filtering the white crystalline solid. The solid product, n-dodecyl tricyclo-[5.2.1.0$^{2,6}$]dec-3-en-8-yl sulfone, was recrystallized from 400 cubic centimeters of ethyl acetate obtaining 363 grams of white crystalline solid having a melting point of 51–52° C. An additional 47 grams of product was recovered from the mother liquor making a total yield of 91.6 percent.

*Analysis.*—Calculated for $C_{22}H_{38}SO_2$: S, 8.78%. Found: S, 8.81%.

n-Dodecyl tricyclo[5.2.1.0$^{2,6}$]dec-3-en-8-yl sulfone (363 grams) was dissolved in 300 grams of ethyl acetate, and to this solution was added 336 grams of a 28.8 weight percent solution of peracetic acid in ethyl acetate over a 1.25-hour period. After an additional reaction period of 5 hours at 60° C. the solution was allowed to stand overnight at room temperature. The reaction product mixture was cooled in a Dry Ice-acetone bath, and the white crystalline solid was filtered. After two recrystallizations from ethyl acetate, there was obtained a 79.8 percent yield of white crystals of n-dodecyl 4-oxatetracyclo-[6.2.1.0$^{2,7}$.0$^{3,5}$]undec-9-yl sulfone melting at 90.5–91.5° C.

*Analysis.*—Calculated for $C_{22}H_{38}SO_3$: S, 8.38%. Found: S, 8.28%. Epoxide purity: 95%.

Example 8

To a pyrex tube there is charged 1.0 gram N-(4-oxatetracyclo[6.2.1.0$^{2,7}$.0$^{3,5}$]undec-9-yl)acrylamide, 9.0 grams vinyl chloride, 5.0 milliliters acetone, and 1.0 milliliter of a 25 percent solution of acetyl peroxide in dimethyl phthalate. The tube is purged with nitrogen, sealed, and rocked in a water bath at 50° C. for 22 hours. The polymer recovered is cast as a film from a cyclohexanone solution of the polymer containing one percent phosphoric acid (based on resin weight). The film is cured at 100° C. for 5 hours. There is formed an insoluble, infusible polymer.

Example 9

To a Pyrex tube there is charged 5.0 grams N-(4-oxatetracyclo[6.2.1.0$^{2,7}$.0$^{3,5}$]undec-9-yl)acrylamide, 5.0 grams acrylonitrile, 5.0 milliliters acetone, and 1.0 milliliter of a 25 percent solution of acetyl peroxide in dimethyl phthalate. The tube is purged with nitrogen, sealed, and rocked in a water bath at 50° C. for 14 hours. The polymer recovered is cast as a film from a dimethylformamide solution of the polymer containing one percent phosphoric acid (based on resin weight). The film is cured at 100° C. for 5 hours. There is formed an insoluble, infusible resin.

Example 10

To a Pyrex tube there is charged 5.0 grams 4-oxatetracyclo[6.2.1.0$^{2,7}$.0$^{3,5}$]undec-9-yl 3-butenoate, 5.0 grams ethyl acrylate, and 1.0 milliliter of a 25 percent solution of acetyl peroxide in dimethyl phthalate. The tube is purged with nitrogen, sealed and rocked in a water bath at 50° C. for 43 hours. The recovered polymer is a fusible resin.

Example 11

To a Pyrex tube there is charged 8 grams 4-oxatetracyclo[6.2.1.0$^{2,7}$.0$^{3,5}$]undec-9-yl allyl ether, 2.0 grams chlorostyrene, and 2.0 milliliters of a 25 percent solution of acetyl peroxide in dimethyl phthalate. The tube is purged with nitrogen, sealed and rocked in a water bath at 50° C. for 22 hours. The polymer recovered is cast as a film from a cyclohexanone solution of the polymer containing one percent phosphoric acid (based on resin weight). The film is cured at 100° C. for 5 hours. There is formed an insoluble infusible polymer.

Example 12

To a Pyrex tube there is charged 10.0 grams 4-oxatetracyclo[6.2.1.0$^{2,7}$.0$^{3,5}$]undec-9-yl allyl ether, and 2.0 milliliters of a 25 percent solution of acetyl peroxide in dimethyl phthalate. The tube and contents are heated at 100° C. for 17 hours. The resulting product is a fusible homopolymeric product. This fusible polymeric product is heated at a temperature of 100° C. for 5 hours in the presence of 0.5 gram of boron trifluoride-monoethylamine complex to obtain a hard, infusible, thermoset resin.

Example 13

4-oxatetracyclo[6.2.1.0$^{2,7}$.0$^{3,5}$]undec-9-yl 3-butenoate (10 grams) is mixed with 0.5 gram of boron trifluoride-monoethylamine complex and heated to 70° C. for 7 hours. The resulting product is a fusible homopolymeric product. The homopolymeric product is heated to 75° C. for 4 hours in the presence of 1.0 milliliter of a 25 percent solution of benzoyl peroxide in dimethyl phthalate to obtain a hard, thermoset, infusible product.

Example 14

N-(4-oxatetracyclo[6.2.1.0$^{2,7}$.0$^{3,5}$]undec-9-yl)-acrylamide (10 grams) is mixed with 0.05 gram of benzoyl peroxide and heated at 100° C. for 12 hours. A fusible product is obtained. The fusible product and citraconic acid are admixed in amounts so as to provide 0.8 carboxyl group of said acid per epoxy group of the fusible product. The resulting admixture then is heated to 120° C. for 5 hours plus an additional 6 hours at 160° C. There is obtained a hard resin.

Example 15

Allyl 4-oxatetracyclo[6.2.1.0$^{2,7}$.0$^{3,5}$]undec-9-yl ether (10 grams) is mixed with 0.05 gram of benzoyl peroxide and heated at 100° C. for 12 hours. A fusible product is obtained. This fusible product and phthalic anhydride are admixed in amounts so as to provide 0.8 carboxyl group of said anhydride per epoxy group of the fusible product. The resulting admixture then is heated to 120° C. for 5 hours plus an additional 6 hours at 160° C. There is obtained a hard resin.

In an analogous manner as above when the initial polymerized product of 5-hexenyl 4-oxatetracyclo-[6.2.1.0$^{2,7}$.0$^{3,5}$]undec-9-yl ether and 4-oxatetracyclo-[6.2.1.0$^{2,7}$.0$^{3,5}$]undec-9-yl undecylenate, 4-oxatetracyclo-[6.2.1.0$^{2,7}$.0$^{3,5}$] are admixed individually with succinic anhydride in amounts so as to provide 1.0 carboxyl group of said anhydride per epoxy group of said polymerized product, followed by curing the resulting admixture under essentially similar operative conditions, there are obtained in each case a hard, infusible resin.

*Example 16*

4-oxatetracyclo[6.2.1.0$^{2,7}$.0$^{3,5}$]undec-9-yl 3-butenoate (30 grams) is mixed with 0.15 gram of benzoyl peroxide and heated at 100° C. for 14 hours. A fusible product is obtained. This fusible product and adipic acid are admixed in amounts so as to provide 0.6 carboxyl group of said acid per epoxy group of said fusible product. The resulting mixture is then heated to 120° C. for 6 hours plus an additional 5 hours at 160° C. There is obtained a hard resin.

*Example 17*

N-(4-oxatetracyclo[6.2.1.0$^{2,7}$.0$^{3,5}$]undec-9-yl)-acrylamide (30 grams) is mixed with 0.15 gram of benzoyl peroxide and heated at 100° C. for 12 hours. A fusible product is obtained. This fusible product and sebacic acid are admixed in amounts so as to provide 1.0 carboxyl group of said acid per epoxy group of said fusible product. The resulting admixture is then heated to 120° C. for 6 hours plus an additional 6 hours at 160° C. There is obtained a hard resin.

*Example 18*

The compound, allyl 4-oxatetracyclo[6.2.1.0$^{2,7}$.0$^{3,5}$]undec-9-yl ether (30 grams) is mixed with 0.15 gram of benzoyl peroxide and heated at 100° C. for 14 hours. A fusible product is obtained. This fusible product and bis-(4-hydroxyphenyl)-2,2-propane are admixed in amounts so as to provide 1.0 hydroxyl group of said bis(4-hydroxyphenyl)-2,2-propane per epoxy group of said fusible product. The resulting admixture is then heated to 120° C. for 6 hours plus an additional 5 hours at 160° C. There is obtained a hard resin.

*Example 19*

The compound, N-(4-oxatetracyclo[6.2.1.0$^{2,7}$.0$^{3,5}$]-undec-9-yl)acrylamide (30 grams), is mixed with 0.15 gram of benzoyl peroxide and heated at 100° C. for 14 hours. A fusible product is obtained. This fusible product and resorcinol are admixed in amounts so as to provide 1.0 hydroxyl group of said resorcinol per epoxy group of said fusible product. The resulting admixture is then heated to 120° C. for 6 hours plus an additional 5 hours at 160° C. There is obtained a hard resin.

*Example 20*

The compound, 4-oxatetracyclo[6.2.1.0$^{2,7}$.0$^{3,5}$]undec-9-yl 3-butenoate (30 grams) is mixed with 0.15 gram of benzoyl peroxide and heated at 100° C. for 14 hours. A fusible product is obtained. This fusible product and adipic acid are admixed in amounts so as to provide 1.0 carboxyl group of said acid per epoxy group of said fusible product. The resulting product is dissolved in methyl isobutyl ketone at 100° C., and an iron panel is dipped into the resulting solution. The iron panel subsequently is removed from this solution, is air dried for 15 minutes, and is baked at 160° C. for 2 hours. A thin coating is observed on that portion of the dipped iron panel. The resulting coating on the panel is glossy and tough. The coating displays excellent adhesion to the panel.

*Example 21*

To a Pyrex tube there is charged 1.0 gram N-(4-oxatetracyclo[6.2.1.0$^{2,7}$.0$^{3,5}$]undec-9-yl)acrylamide, 9.0 grams vinyl chloride, 5.0 milliliters acetone, and 1.0 milliliter of a 25 percent solution of acetyl peroxide in dimethyl phthalate. The tube is purged with nitrogen, sealed and rocked in a water bath at 50° C. for 22 hours. The polymer is recovered and phthalic anhydride is admixed with it in an amount so as to provide 0.8 carboxyl group of said anhydride per epoxy group of the polymer product. The resulting admixture then is heated to 120° C. for 5 hours plus an additional 6 hours at 160° C. There is obtained a hard resin.

*Example 22*

To a Pyrex tube there is charged 5.0 grams allyl 4-oxatetracyclo[6.2.1.0$^{2,7}$.0$^{3,5}$]undec-9-yl ether, 5.0 grams acrylonitrile, 5.0 milliliters acetone, and 1.0 milliliter of a 25 percent solution of acetyl peroxide in dimethyl phthalate. The tube is purged with nitrogen, sealed and rocked in a water bath at 50° C. for 14 hours. The polymer is recovered and adipic acid is admixed with it in an amount so as to provide 0.6 carboxyl groups of said anhydride per epoxy group of the polymer product. The resulting admixture then is heated to 120° C. for 5 hours plus an additional 6 hours at 160° C. There is obtained a hard resin.

*Example 23*

To a Pyrex tube there is charged 5.0 gram N-(4-oxatetracyclo[6.2.1.0$^{2,7}$.0$^{3,5}$]undec-9-yl)acrylamide, 5.0 grams ethyl acrylate, 5.0 milliliters acetone, and 1.0 milliliter of a 25 percent solution of acetyl peroxide in dimethyl phthalate. The tube is purged with nitrogen, sealed and rocked in a water bath at 50° C. for 43 hours. The polymer is recovered and catechol is admixed with it in an amount so as to provide 1.0 hydroxyl group of said catechol per epoxy group of the polymer product. The resulting admixture then is heated to 120° C. for 5 hours plus an additional 6 hours at 160° C. There is obtained a hard resin.

*Example 24*

To a Pyrex tube there is charged 8.0 grams 4-oxatetracyclo[6.2.1.0$^{2,7}$.0$^{3,5}$]undec-9-yl 3-butenoate, 2.0 grams chlorostyrene, 5.0 milliliters acetone, and 1.0 milliliter of a 25 per cent solution of acetyl peroxide in dimethyl phthalate. The tube is purged with nitrogen, sealed and rocked in a water bath at 50° C. for 17 hours. The polymer is recovered and glycerol is admixed with it in an amount so as to provide 1.0 hydroxyl group of said glycerol per epoxy group of the polymer product. The resulting admixture then is heated to 120° C. for 5 hours plus an additional 6 hours at 160° C. There is obtained a hard resin.

What is claimed is:
1. A monoepoxide having the general formula:

wherein Y represents a member selected from the group consisting of halo, R—O—,

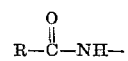

and R'—SO$_2$—; wherein R represents a hydrocarbon radical, which is free of acetylenic unsaturation, with the proviso that when R in the R—O— group is an alkenyl moiety, the ethylenically unsaturated carbon to carbon bond is at least one carbon atom removed from the ether oxygen atom; and wherein R' represents a saturated hydrocarbon radical.

2. Alkenyl 4-oxatetracyclo[6.2.1.0$^{2,7}$.0$^{3,5}$]undec - 9 - yl ether wherein the ethylenic group of the alkenyl radical is at least one carbon atom removed from the ether oxygen atom.

3. N - (4-oxatetracyclo[6.2.1.0$^{2,7}$.0$^{3,5}$]undec-9-yl)alkanamide.

4. N - (4-oxatetracyclo[6.2.1.0$^{2,7}$.0$^{3,5}$]undec-9-yl)alkenamide.

5. Allyl 4-oxatetracyclo[6.2.1.0$^{2,7}$.0$^{3,5}$]undec - 9 - yl ether.

6. 4-oxatetracyclo[6.2.1.0$^{2,7}$.0$^{3,5}$]undec - 9 - yl propyl ether.

7. N - (4-oxatetracyclo[6.2.1.0$^{2,7}$.0$^{3,5}$]undec-9-yl)acrylamide.

8. N-(4-oxatetracyclo[6.2.1.0$^{2,7}$.0$^{3,5}$]undec - 9 - yl)propionamide.

9. A homopolymer of the monoepoxide having the general formula:

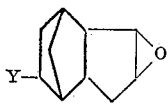

wherein Y represents a member selected from the group consisting of R—O—, and

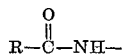

wherein R represents an unsaturated hydrocarbon radical, which is free of acetylenic unsaturated hydrocarbon radical, which is free of acetylenic unsaturation with the proviso that the ethylenically unsaturated group in R of the R—O— group is at least one carbon atom recoved from the ether oxygen atom.

10. A homopolymer of alkenyl 4 - oxatetracyclo [6.2.1.0$^{2,7}$.0$^{3,5}$]undec-9-yl ether wherein the ethylenically unsaturated carbon to carbon bond is at least one carbon atom removed from the ether oxygen atom.

11. The homopolyer of claim 9 wherein the polymerization occurs through the epoxy groups.

12. The homopolymer of claim 9 wherein the polymerization occurs through the ethylenically unsaturated carbon to carbon bond.

13. A copolymer resulting from the polymerization reaction of a monoepoxide having the general formula:

wherein Y represents a member selected from the group consisting of R—O—, and

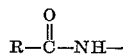

wherein Y represents an unsaturated hydrocarbon radical, free of acetylenic unsaturation with the proviso that the ethylenically unsaturated group in R of the R—O— group is at least one carbon atom removed from the ether oxygen atom; and a polymerizable monomer containing at least one ethylenically unsaturated polymerizable group said polymerization reaction being effected through the ethylenically unsaturated carbon to carbon bonds of the afore-described compounds.

14. The composition of claim 13 polymerized through the epoxy groups.

References Cited by the Applicant
UNITED STATES PATENTS

| | | | |
|---|---|---|---|
| 2,324,483 | 7/1943 | Caston | 260—47 |
| 2,393,610 | 1/1946 | Bruson | 260—611 |
| 2,543,419 | 2/1951 | Niederhauser | 260—2 |
| 2,962,453 | 11/1960 | Philips | 260—348 |
| 2,962,469 | 11/1960 | Phillips et al. | 260—45.4 |
| 3,031,439 | 4/1962 | Bailey | 260—2 |
| 3,040,010 | 6/1962 | Shokal et al. | 260—2 |
| 3,066,151 | 11/1962 | Thorne et al. | 260—348 |

OTHER REFERENCES

Noller, C.R., "Chemistry of Organic Compounds" pp. 59, 101, 137, 229, 245, 278-9, W. B. Saunders Co., Philadelphia, 1957 (Copy in Group 140).

Bruson et al. J.A.C.S. vol. 68 January 1946 pages 8-10 (Copy in Sci. Lib.) 260–611F.

JOSEPH L. SCHOFER, *Primary Examiner.*

MILTON STERMAN, J. R. LIBERMAN, *Examiners.*